Patented June 24, 1941

2,247,331

UNITED STATES PATENT OFFICE 2,247,331

GLASSMAKING BATCH

John Ferguson, Cleveland, Ohio

No Drawing. Application January 22, 1938, Serial No. 186,373

4 Claims. (Cl. 106—54)

This invention relates to batches for manufacture of glass. The present application is a continuation in part of my copending application Serial No. 169,138, filed October 15, 1937.

One object of the invention is to obviate by suitable choice of batch materials the formation of gas bubbles or seed and thus to make possible the production of glass of a composition having a viscosity at furnace temperatures which has largely prevented the escape of the seed formed by the batches heretofore in use. By means of my invention, the formation of seed is practically prevented and glass of such viscosity may therefore be commercially produced. This result is particularly applicable to glass having a high silica content, e. g. from 80% to 90%.

Another result from the control of the formation of seed is that glass of any well known composition may be produced free from seed, without being subjected to the lengthy refining processes now necessarily employed to permit escape of seed or solution of the seed in the glass material.

Another result from the control of the formation of gas bubbles is that little or no gas is dissolved in the glass during the cooling to working temperatures. The finished product therefore has little or no gaseous content even in solution and is therefore particularly useful for vacuum tubes for radio or other uses. In such tubes the gaseous content of the glass slowly escapes with repeated heating and reduces the vacuum within the tube. The reduction of the gaseous content of the glass therefore greatly increases the life of the tube.

The same reduction in the gaseous content of the finished product makes it well suited for chemical glassware in which the escape of gas from the glass during a delicate chemical experiment may vitiate the results of the experiment.

These results are obtained by selecting only such batch materials as do not form gaseous reaction products in the melting operation, in contrast to the prior practice of including certain materials in each batch for the very purpose of producing large volumes of gas. Many of these gasless batch materials are well known in the art of glass making and the properties resulting from their inclusion in the ordinary gas forming batches are well known, but it could not be determined in advance of actual tests, that batches made up entirely (within limits set by the purity of commercially available materials) of non-gas forming ingredients would or could be made to produce a commercially usable glass or what the characteristics of glass so produced would be. In fact, it has heretofore been thought necessary to provide in each batch at least one ingredient which forms sufficient gas to give bubbles of large size which in their passage through the molten material serve to "sweep out" a large quantity of the smaller bubbles forming the microscopic seed and to promote convection currents in the molten body. To this end certain ingredients such as arsenic, various nitrates, carbonates, etc. which produce large quantities of gas are often added to a batch to help overcome a seedy condition. To the best of my knowledge, the production of glass from batches substantially free from gas forming ingredients has not been attempted prior to my invention.

The invention therefore consists in the selection of certain batch materials, most of which may be old and well known, and the combining of these materials in such manner as to produce a distinct advance in the ancient art of glass manufacture.

As specific examples of the ingredients which may be used in forming gasless batches the following are given by way of example only:

Silicon: May be supplied in the usual form of silica sand but should be carefully dried to prevent the formation of water vapor.

Boron: Preferably supplied in the form of calcined borax instead of the usual hydrates. Calcined borax consists of boron, sodium and oxygen in the proper proportions to form the oxides without evolution of gas.

Sodium: For boro-silicate glass may be supplied in part by calcined borax. The remainder and all of the sodium for other types of glass may be obtained from various soda feldspars or from sodium oxide. In the feldspars the sodium is present in the form of combined oxides of sodium, aluminum, silicon and sometimes calcium and potassium. They ordinarily do not have water of crystallization or other gas forming constituent. The carbonate, sulphate and chloride of sodium are not used.

Potassium: From potash feldspars or potassium oxide. Carbonates, sulphates and nitrates not used.

Lithium: The oxide ($Li_2O$).

Barium: The oxide (BaO).

Calcium: Principally from burnt lime (CaO) preferably freshly burnt. Also from soda-lime feldspars. No carbonate or hydrate is used.

Lead: Preferably in the form of litharge (PbO). Red lead ($Pb_3O_4$) when heated gives off oxygen but this occurs at a relatively low temperature before melting actually begins so that the gas does not act to form seed. The use of red lead therefore is not entirely unsuitable.

Aluminum: The oxide itself, calcined alumina and feldspars. The hydrates such as bauxite and kaolin are not suitable.

Zinc: Zinc oxide, (ZnO). The carbonate is not suitable.

Magnesium: The oxide obtained by calcination of various minerals. The carbonates and sulphates are not suitable without calcination.

Various coloring agents and decolorizing agents may be employed, usually in the form of metallic oxides which do not produce free oxygen on heating.

All ingredients should be carefully dried to expel water vapor which is a seed forming agent and to expel such gaseous material as may be absorbed in the ingredients.

In the production of glass from gasless batches the ingredients are chosen to give the desired analysis of the finished product. As examples the following batches are given:

BATCH A.—*Soda-lime glass*

| | Pounds |
|---|---|
| Silica sand | 290 |
| Burnt lime | 60 |
| Soda feldspar | 650 |
| | 1000 |

BATCH B.—*Borosilicate glass*

| | Pounds |
|---|---|
| Silica sand | 707 |
| Feldspar | 133 |
| Calcined borax | 160 |
| | 1000 |

BATCH C.—*Borosilicate glass*

| | Pounds |
|---|---|
| Silica sand | 790 |
| Feldspar | 50 |
| Calcined borax | 160 |
| | 1000 |

BATCH D.—*Borosilicate glass, high in silica*

| | Pounds |
|---|---|
| Silica sand | 815 |
| Feldspar | 80 |
| Calcined borax | 105 |
| | 1000 |

One feldspar commercially available for batches B, C and D has the following analysis: $SiO_2$ 69.10%, $Al_2O_3$ 17.78%, iron .06%, CaO .24%, magnesia tr., $K_2O$ 10.14% and $Na_2O$ 2.57%.

When this feldspar is used batches B, C and D give the following analyses of finished product:

| | Batch B | Batch C | Batch D |
|---|---|---|---|
| | Percent | Percent | Percent |
| $SiO_2$ | 79.90 | 82.45 | 87.04 |
| $Al_2O_3$ | 2.36 | .89 | 1.42 |
| CaO | .03 | .01 | .02 |
| $K_2O$ | 1.35 | .51 | .81 |
| $Na_2O$ | 5.28 | 5.06 | 3.44 |
| $B_2O_3$ | 11.08 | 11.08 | 7.27 |

Batches A and B illustrate the use of the invention in producing well-known forms of glass, batch A producing a common soda-lime glass and batch B producing a well known boro-silicate glass. Batches C and D illustrate the use of the invention in producing a glass which to the best of my knowledge has not before been commercially possible. These batches represent a progressive increase in the silica content over batch B with a corresponding reduction in the alkali and boron contents. Batches in the series intermediate between B and C and between C and D, of course, may also be used. The increase in silica content results in a corresponding decrease in the coefficient of thermal expansion which in the case of glass made from batch D is less than $29 \times 10^{-7}$. Such glass is useful for heat resisting ware and for many other uses requiring a low coefficient of expansion, resistance to chemical attack, high mechanical strength or high transmission of ultra-violet rays, but the difficulty in removing seed due to the viscosity of the melted glass has heretofore rendered the same commercially impractical. By the use of batch materials which produce little or no seed, such glass may be commercially produced.

Another important advantage in the use of gasless batches is the reduction in heat required for melting. The evolution of gas in the usual carbonate and hydrate batches is an endothermic process consuming a large percentage of the heat supplied to the furnace. In addition, the gases formed are heated to a high temperature and the heat thus absorbed is wasted. In the melting of the gasless batches there are no endothermic reactions and practically no gas to be heated. The necessity for this additional heat supply is thus eliminated.

Another important advantage is the reduction in weight of batch material required to produce a given weight of glass. Since practically all of the batch materials are in the form of oxides, either free or combined with other oxides, and since these oxides all go into mutual solution in the glass, there is no appreciable loss of weight in the melting operation. For best results, batches are used which are so free from gas forming ingredients that the small amount of material absorbed from the refractory furnace lining more than makes up for any loss of weight. This factor contributes to a reduction in cost of the batch since less material is required for a pound of finished glass and since the cost per pound of the gasless batch materials is comparable with the cost of those now in common use and in the case of high silica glass is considerably less.

Another important advantage in the use of gasless batches resides in the longer life of the furnaces employed. The nascent gases produced in the usual reactions of glass making have an active chemical effect upon the refractory furnace linings and upon electrodes or conductors used in the heating of electric furnaces. This chemical attack is largely eliminated by the use of gasless batches.

The invention claimed is:

1. A glass making batch for a high silica, borosilicate-alkali glass, consisting of silica, feldspar, and calcined borax proportioned to form a glass having 80 to 87% silica, said batch being adapted for melting in an electric furnace and being substantially free from gas forming ingredients, whereby a substantially seedless product may be obtained without additional fining agents or processes.

2. A glass making batch for a high silica, borosilicate-alkali glass consisting of 700 to 800 parts by weight of sand, 50 to 130 parts by weight of feldspar, and 100 to 160 parts by weight of calcined borax, said batch being adapted for melting in an electric furnace and being substantially free from gas forming ingredients, whereby a substantially seedless product may be obtained without additional fining agents or processes.

3. A glass making batch for a high silica, borosilicate-alkali glass consisting of 70 to 82% sand, the remainder being substantially all feldspar and calcined borax varying in proportion from 24% feldspar and 76% calcined borax to 45% feldspar and 55% calcined borax, said batch being adapted for melting in an electric furnace and being substantially free from gas forming ingredients, whereby a substantially seedless product may be obtained without additional fining agents or processes.

4. A glass making batch for a high silica, borosilicate-alkali glass containing silica, boric oxide, and one or more alkali oxides, proportioned to produce a glass having 80 to 87% silica, said batch being adapted for melting in an electric furnace and all of the ingredients thereof being in a substantially non-gas forming form, whereby a substantially seedless product may be obtained without additional fining agents or processes.

JOHN FERGUSON.